US007743372B2

(12) United States Patent  (10) Patent No.: US 7,743,372 B2
Armstrong et al.  (45) Date of Patent: Jun. 22, 2010

(54) DYNAMIC CLUSTER CODE UPDATING IN LOGICAL PARTITIONS

(75) Inventors: William Joseph Armstrong, Rochester, MN (US); Michael Howard Hartung, Tucson, AZ (US); Yu-Cheng Hsu, Tucson, AZ (US); Glenn Rowan Wightwick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 11/169,252

(22) Filed: Jun. 28, 2005

(65) Prior Publication Data

US 2006/0294323 A1  Dec. 28, 2006

(51) Int. Cl.
*G06F 9/44* (2006.01)
*G06F 9/45* (2006.01)
(52) U.S. Cl. .................... 717/168; 717/170; 717/171
(58) Field of Classification Search .......... 717/168–175
See application file for complete search history.

(56) References Cited

U.S. PATENT DOCUMENTS

| 5,359,730 | A |  | 10/1994 | Marron |  |
|---|---|---|---|---|---|
| 5,696,895 | A |  | 12/1997 | Hemphill et al. |  |
| 5,919,247 | A | * | 7/1999 | Van Hoff et al. | ............ 709/217 |
| 5,940,612 | A |  | 8/1999 | Brady et al. |  |
| 6,189,145 | B1 | * | 2/2001 | Bellin et al. | ................ 717/170 |
| 6,199,179 | B1 |  | 3/2001 | Kauffman et al. |  |
| 6,279,046 | B1 |  | 8/2001 | Armstrong et al. |  |
| 6,363,495 | B1 |  | 3/2002 | MacKenzie et al. |  |
| 6,378,021 | B1 |  | 4/2002 | Okazawa et al. |  |
| 6,421,679 | B1 |  | 7/2002 | Chang et al. |  |
| 6,460,039 | B1 |  | 10/2002 | Pinter et al. |  |
| 6,463,584 | B1 | * | 10/2002 | Gard et al. | ................... 717/171 |
| 6,598,069 | B1 |  | 7/2003 | Rooney et al. |  |
| 6,643,843 | B1 | * | 11/2003 | Reger | ......................... 717/168 |
| 6,745,312 | B1 |  | 6/2004 | Schnee et al. |  |
| 6,754,656 | B1 |  | 6/2004 | Cornwell et al. |  |
| 6,898,705 | B2 | * | 5/2005 | Abboud et al. | .............. 713/100 |
| 6,944,785 | B2 |  | 9/2005 | Gadir et al. |  |
| 6,944,788 | B2 |  | 9/2005 | Dinker et al. |  |
| 6,973,654 | B1 |  | 12/2005 | Shutt et al. |  |
| 6,976,079 | B1 | * | 12/2005 | Ferguson et al. | ............ 709/229 |
| 6,990,660 | B2 | * | 1/2006 | Moshir et al. | ............... 717/171 |

(Continued)

FOREIGN PATENT DOCUMENTS

CN  1554055 A  12/2004

OTHER PUBLICATIONS

Symborski, "Updating software and configuration data in a distributed communication network", IEEE, pp. 331-338, 1988.*

(Continued)

*Primary Examiner*—Anil Khatri
(74) *Attorney, Agent, or Firm*—William K. Konrad; Konrad Raynes & Victor LLP

(57) ABSTRACT

A first logical partition in a first processing complex of a server cluster is operated at a first level of a software code. Software code in a second logical partition in the same processing complex is updated to a second level. Processing operations are assumed by the second logical partition operating at the second level of software code. Other embodiments are described and claimed.

28 Claims, 4 Drawing Sheets

U.S. PATENT DOCUMENTS

| | | | |
|---|---|---|---|
| 7,051,327 B1 * | 5/2006 | Milius et al. | 717/177 |
| 7,055,149 B2 * | 5/2006 | Birkholz et al. | 717/172 |
| 7,117,393 B2 | 10/2006 | Baba et al. | |
| 7,158,248 B2 * | 1/2007 | Smith et al. | 358/1.15 |
| 7,200,847 B2 * | 4/2007 | Straube et al. | 719/313 |
| 7,213,065 B2 * | 5/2007 | Watt | 709/223 |
| 7,222,339 B2 * | 5/2007 | Rothman et al. | 717/168 |
| 7,225,356 B2 | 5/2007 | Monitzer | |
| 7,237,239 B1 * | 6/2007 | Goel et al. | 717/170 |
| 7,246,256 B2 | 7/2007 | De La Cruz et al. | |
| 7,412,545 B2 | 8/2008 | Boutcher et al. | |
| 7,500,234 B2 * | 3/2009 | Hatasaki | 717/168 |
| 2002/0010844 A1 | 1/2002 | Noel et al. | |
| 2002/0099756 A1 | 7/2002 | Catthoor et al. | |
| 2002/0156824 A1 | 10/2002 | Armstrong et al. | |
| 2003/0084372 A1 | 5/2003 | Mock et al. | |
| 2003/0115442 A1 | 6/2003 | Whitney | |
| 2003/0177325 A1 | 9/2003 | Jann et al. | |
| 2003/0182546 A1 | 9/2003 | Suzuki et al. | |
| 2004/0158834 A1 | 8/2004 | Ham et al. | |
| 2004/0168170 A1 | 8/2004 | Miller | |
| 2004/0210890 A1 | 10/2004 | Armstrong et al. | |
| 2004/0221193 A1 | 11/2004 | Armstrong et al. | |
| 2005/0005200 A1 | 1/2005 | Matena et al. | |
| 2005/0283658 A1 | 12/2005 | Clark et al. | |
| 2005/0289390 A1 | 12/2005 | Baba | |
| 2006/0224854 A1 | 10/2006 | Nakamura | |
| 2006/0294323 A1 | 12/2006 | Armstrong et al. | |

OTHER PUBLICATIONS

Storm, "Continuous release and upgrade of component based software", ACM SCM, pp. 43-57, 2005.*

Crameri et al, "Staged deployment in mirage and integrated software upgrade tetsiing and distribution system", ACM SOSP, pp. 221-236, 2007.*

Boyapati et al, "Lazy modular upgrades in persistent object stores", ACM OOPSLA, pp. 403-417, 2003.*

U.S. Patent Application entitled "Cluster Code Management", filed Jun. 28, 2005, serial number not yet assigned, IBM, by inventors M.H. Hartung, Y. Hsu, and G.R. Wightwick.

U.S. Patent Application entitled "Cluster Availability Management", filed Jun. 28, 2005, serial number not yet assigned, IBM by inventors W.J. Armstrong, M.H. Hartung, Y. Hsu, and G.R. Wightwick.

D. Hu, et al., "IBM eserver pSeries Dynamic Logical Partitioning (DLPAR) in AIX 5.2 with Oracle", IBM Corporation, Redbooks paper, 2003, pp. 1-22.

Summary of art cited in Chinese Office Action dated Dec. 10, 2007 for Application No. 200610075312.4, filed Apr. 12, 2006, IBM, counterpart of U.S. Appl. No. 11/169,251, filed Jun. 28, 2005.

U.S. Office Action dated Sep. 23, 2009 for U.S. Appl. No. 11/169,251 filed Jun. 28, 2005 by inventors M.H. Hartung, et al.

* cited by examiner

DYNAMIC CLUSTER CODE UPDATING IN LOGICAL PARTITIONS

BACKGROUND

1. Field of the Invention

The present invention relates to management of code updates in a cluster.

2. Description of Related Art

In certain computing environments, multiple host systems may communicate with a control unit, such as an IBM Enterprise Storage Server (ESS)®, for data in a storage device managed by the ESS receiving the request, providing access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit, also known as a cluster, may include duplicate and redundant processing nodes, also known as processing complexes, to allow for failover to a surviving processing complex in case one fails. The processing complexes may access shared resources such as input/output (I/O) adapters, storage adapters and storage devices.

A processing complex may perform various processing operations such as input/output operations, for example. To update the software or other code being executed by the processing complexes of a server cluster, one processing complex may be quiesced, causing processing operations such as the input/output operations of that processing complex to be taken over by the other processing complex or complexes of the server cluster in a failover operation. The code of the quiesced processing complex may then be updated. Following updating of the code for a particular processing complex, that processing complex may resume performing input/output or other processing operations after a failback operation. This updating procedure may be repeated for the remaining processing complexes of the server node.

The resources of each processing complex may be divided into a number of logical partitions (LPAR), in which a computer's processors, memory, and hardware resources are divided into multiple environments. Each environment can be operated independently, with its own operating system and applications. Logical partitioning of a processing complex adds flexibility in workload management on a single server, with the ability to partition the single machine into many logical servers with their own sets of system resources. The resources in each partition may be combined in various amounts and combinations. Also, the number of logical hardware partitions that can be created depends on the hardware system.

Dynamic Logical Partitioning (DLPAR) extends the capability of LPAR by providing the ability to logically attach and detach the resources of a processing complex to and from the operating system of a logical partition without rebooting. This resource allocation can occur not only when activating a logical partition, but also while the partitions are running. Processor, memory, I/O adapter and other partition resources can be released into a "free pool," acquired from that free pool, or moved directly from one partition to another within a processing complex, in various amounts or combinations. However, each partition generally has at least one processor, memory, an I/O adapter associated with a boot device, and a network adapter.

The movement of an LPAR resource from one hardware partition to another within a processing complex may be managed by a supervisor module. To transfer a partition resource, the supervisor module can send a network request to the logical partition which "owns" the partition resource, asking that logical partition to release the particular partition resource and put it into a quiesced state. In this manner, the partition resource is stopped, and placed under control of a hypervisor module. The supervisor module can send a command to the hypervisor, instructing it to reallocate the partition resource from the prior logical partition to another logical partition. In addition, the supervisor module can send a network request to the other logical partition, instructing it to acquire the partition resource from the hypervisor module and configure it for use by that other logical partition.

SUMMARY

A first logical partition in a first processing complex of a server cluster is operated at a first level of a software code. Software code in a second logical partition in the same processing complex is updated to a second level. Processing operations are assumed by the second logical partition operating at the second level of software code. Other embodiments are described and claimed.

DETAILED DESCRIPTION

Figure 1:
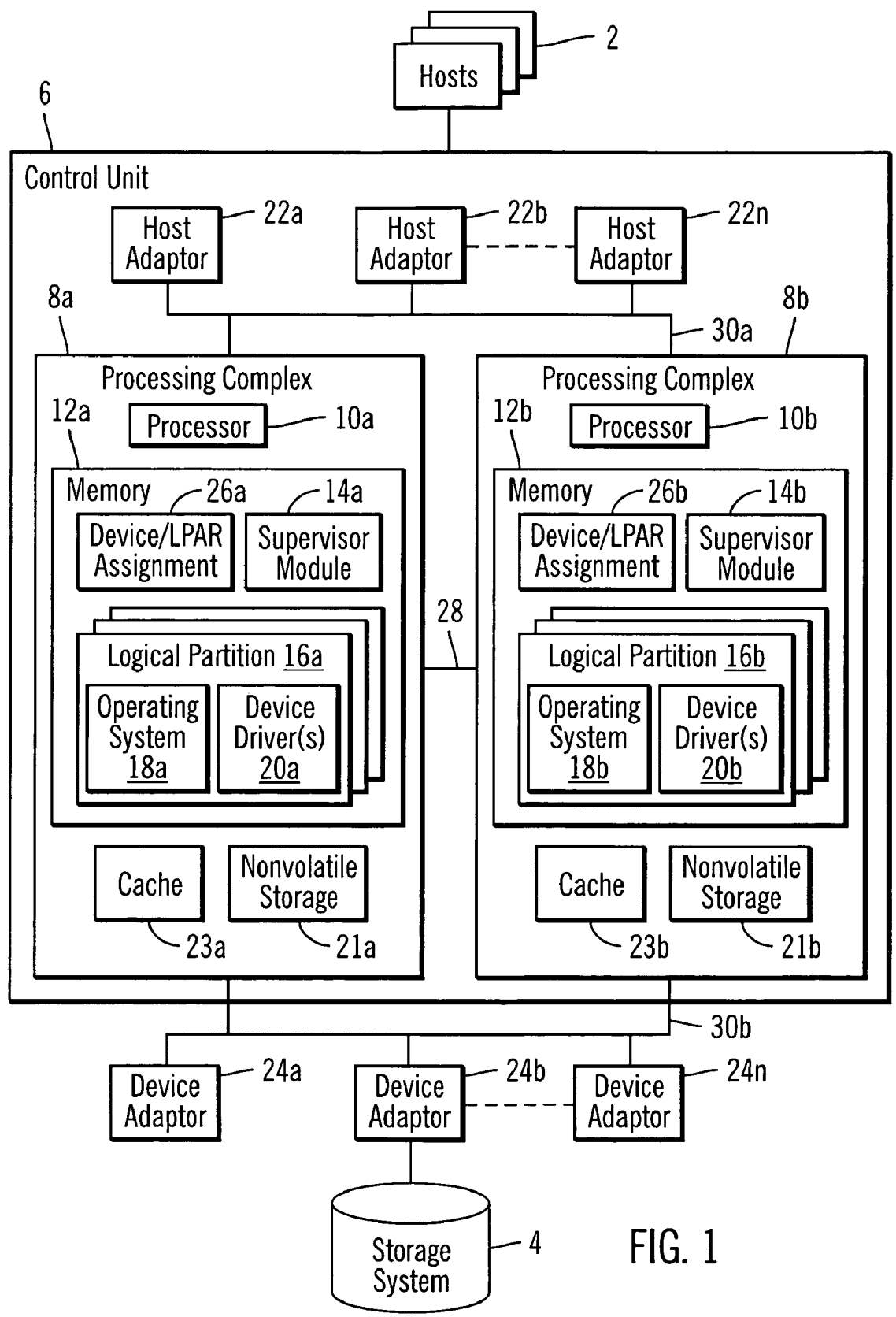
FIG. 1 illustrates a computing environment in which embodiments may be implemented.

FIG. 1 illustrates one example of a computing environment in which aspects of the present description may be employed. One or more hosts 2 communicate Input/Output (I/O) tasks or requests directed to a storage system 4, to a control unit or cluster 6, where the cluster 6 manages access to the storage system 4. In one embodiment, the cluster 6 is comprised of two processing nodes or complexes 8a, 8b, each including a processor 10a, 10b and a memory 12a, 12b. Each processor 10a, 10b can include one or more central processing units (CPUs) available as processing resources to the associated processing complex 8a, 8b.

Each processing complex 8a, 8b includes a supervisor module 14a, 14b. The supervisor modules 14a, 14b comprise code that manage and coordinate the operations of one or more logical partitions 16a, 16b executing in the processing complexes 8a, 8b. Each logical partition 16a, 16b separately executes an operating system 18a, 18b and device drivers 20a, 20b. The logical partitions comprise a division of the processors 10a, 10b into logical independent processing systems each having their own operating systems 18a, 18b and device drivers 20a, 20b. Multiple logical partitions may execute in each processing complex, managed by the supervisor module for that complex.

In the illustrated embodiment, the logical partition 16a maintains state information in a data structure stored in a nonvolatile storage 21a of the processing complex 8a. This state information identifies the various states of the various state machines of the cluster 6. A synchronized copy of the cluster state information is similarly maintained by the logical partition 16b in a data structure stored in a nonvolatile storage 21b of the processing complex 8b. This state information facilitates control of the processing operations such as input/output operations being performed by the logical partitions 16a, 16b of the cluster 6 on behalf of a host 2. The logical partitions 16a, 16b may exchange state information between each other to facilitate each active partition maintaining current state information concerning cluster operations. In addition, the logical partitions maintain other data structures in the nonvolatile storage 21a, 21b, which facilitate performing the processing operations in response to tasks received from the hosts 2 such as input/output tasks, for example. Each logical partition 16a, 16b also has access to a cache 23a, 23b for storing data for the performance of the processing tasks received from the hosts 2.

Each device driver 20a, 20b provides an interface between the operating system 18a, 18b, in the logical partition 16a, 16b in which the device driver 20a, 20b executes, and an external device, such as host adaptors 22a, 22b ... 22n and device adaptors 24a, 24b ... 24n. The host adaptors 22a, 22b ... 22n enable the processing complexes 8a, 8b to communicate with the hosts 2 and the device adaptors 24a, 24b ... 24n enable the processing complexes 8a, 8b to communicate with the storage system 4. Thus, the processing complexes 8a, 8b share devices, such as adaptors 22a, 22b ... 22n, 24a, 24b ... 24n. The variable "n" is used to denote an integer instance of an element, and may indicate different or the same integer value when used with different elements. For instance, 22n and 24n may indicate a same or different number of host adaptors 22n and device adaptors 24n.

The processing complexes 8a, 8b communicate with the host adaptors 22a, 22b ... 22n over a fabric 30a and the device adaptors 24a, 24b ... 24n over a fabric 30b. The fabrics 30a, 30b may comprise one or more interfaces providing communication paths between the processing complexes 8a, 8b and adaptors. A path comprises the hardware in the fabrics 30a, 30b that enables communication with shared adaptors over the fabric. In one embodiment, the fabric may comprise a Fibre Channel arbitrated loop configuration, a serial loop architecture or a bus interface, such as a Peripheral Component Interconnect (PCI) interface. Each processing complex 8a, 8b may be assigned a portion of the adaptors 22a, 22b ... 22n, 24a, 24b ... 24n and during initialization, the processing complexes 8a, 8b are responsible for initializing portions of the fabrics 30a, 30b providing communication paths to the adaptors that are assigned to that processing complex. For instance, if processing complex 8a is assigned adaptors 22a, 22b, 24a, 24b, then processing complex 8a would initialize and configure that portion of the fabric 30a, 30b providing communication paths between processing complex 8a and adaptors 22a, 22b, 24a, 24b. Likewise, if processing complex 8b is assigned adaptors 22c (not shown) ... 22n and 24c (not shown) ... 24n, then processing complex 8b would initialize and configure that portion of the fabric 30a, 30b and paths enabling communication between processing complex 8b and adaptors 22c ... 22n and 24c ... 24n. Configuring the fabrics 30a, 30b comprises setting registers in fabric hardware, e.g., the Fibre Channel loop hardware, serial loop architecture hardware or bus interface hardware, and performing other initialization and discovery related operations. Each individual adaptor 22a, 22b ... 22n, 24a, 24b ... 24n may be shared by the processing complexes 8a, 8b.

The supervisor modules 14a, 14b in connection with a hypervisor module 26a, 26b, maintains device/logical partition (LPAR) assignments identifying each assignment of the adaptors 22a, 22b ... 22n, 24a, 24b ... 24n to a logical partition 16a, 16b in each processing complex 8a, 8b, such that communication between a specific adaptor 22a, 22b ... 22n, 24a, 24b ... 24n and the processing complex 8a, 8b is handled by the device driver 20a, 20b executing in the logical partition 16a, 16b assigned to the specific adaptor 22a, 22b ... 22n, 24a, 24b ... 24n.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b ... 24n, over a device network (not shown), which may comprise a local area network (LAN), storage area network (SAN), bus interface, serial interface, etc. Further, the processing complexes 8a, 8b communicate over a connection 28 enabling processor inter-communication to manage configuring operations performed with respect to the shared devices, such as the shared adaptors 22a, 22b ... 22n, 24a, 24b ... 24n. In alternative embodiments, there may be only one fabric connecting all adaptors 22a, 22b ... 24n, 24a, 24b ... 24n, i.e., fabrics 30a and 30b may be part of a single interconnected fabric, or two fabrics, such as shown 30a and 30b, or more than two fabrics.

The cluster 6 may comprise any type of server, such as an enterprise storage server, storage controller, etc., or other device used to manage I/O requests to attached storage system(s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the cluster 6, via the adaptors 22a, 22b ... 22n, over a network (not shown), such as a Local Area Network (LAN), Storage Area Network (SAN), Wide Area Network (WAN), wireless network, etc. Alternatively, the hosts 2 may communicate with the cluster 6 over a bus interface, such as a Peripheral Component Interconnect (PCI) bus or serial interface. It is further appreciated that the cluster 6 may also be, for example, a generic server cluster, not just a storage subsystem or storage controller. For example, the two servers could be IBM pSeries servers running a highly available clustered application, such as Lotus Notes®.

Figure 2:
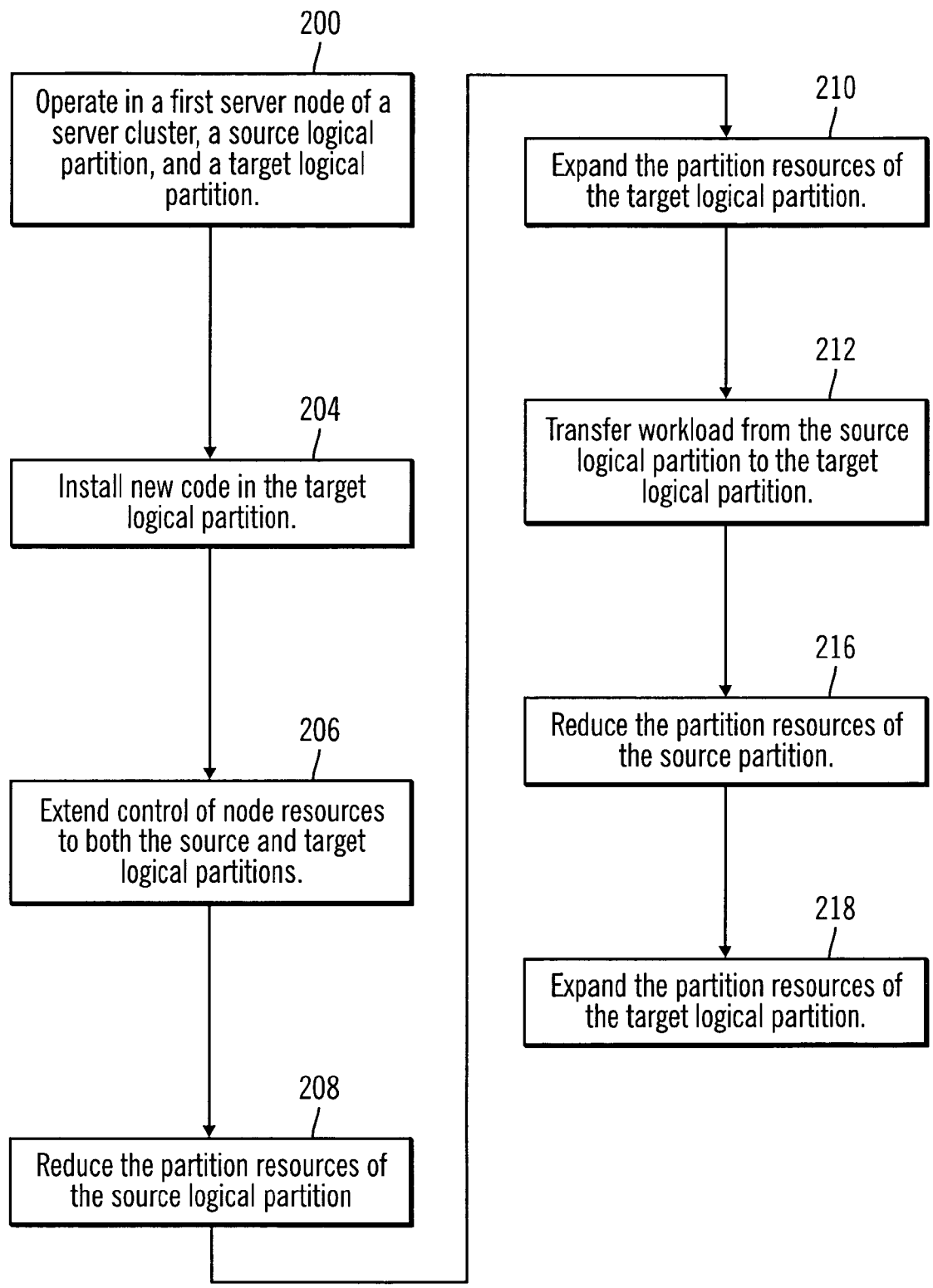
FIG. 2 illustrates operations to update software code in a logical partition of a processing complex.
Figure 3:
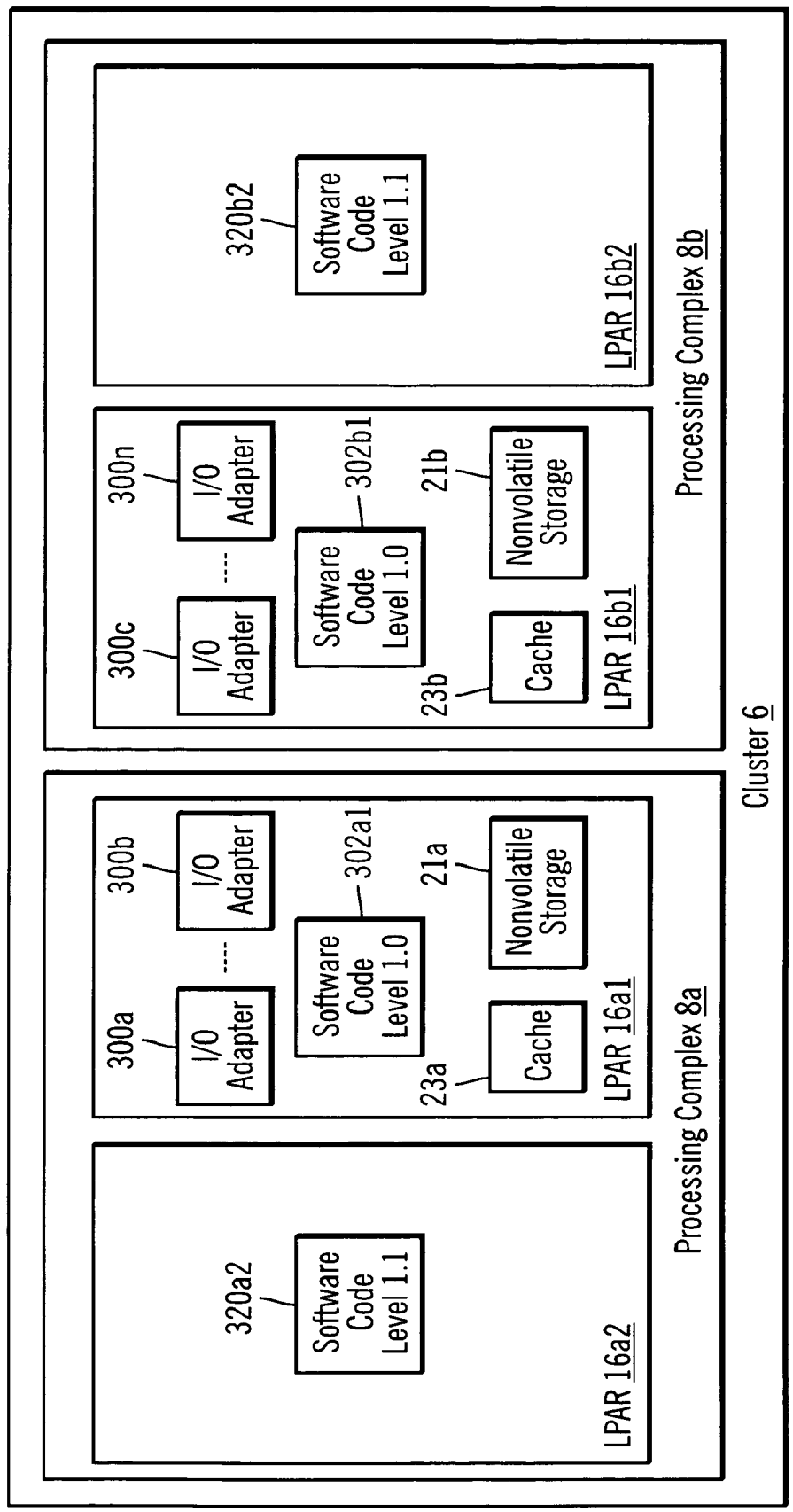
FIG. 3 is a schematic diagram of a source logical partition and a target logical partition in a processing complex.

In accordance with one aspect of the present description, FIG. 2 illustrates one example of operations of a cluster in which the code of a processing complex of the cluster may be updated in a manner which can reduce interruptions in processing operations by the processing complex. In one operation, the cluster operates (block 200) in a first node or processing complex of the cluster, a first logical partition as a source and a second logical partition in the same processing complex as a target. FIG. 3 is a diagram which schematically illustrates an example of the cluster 6 operating a first logical partition 16a1 of the processing complex 8a, as a source logical partition. In addition, a second logical partition 16a2 of the processing complex 8a is operated as a target logical partition.

As used herein, a source logical partition is a functionally operational logical partition that at least initially is capable of performing processing tasks received from a host 2. In addition, a source logical partition is a logical partition from which resources may be removed. Conversely, a target logical partition is a logical partition to which resources may be assigned. In the embodiment of FIG. 3, a third logical partition 16b1 of the processing complex 8b, may be operated as a source logical partition, and a fourth logical partition 16b2 of the processing complex 8b may be operated as a target logical partition.

In the illustrated embodiment, the source logical partitions 16a1, 16b1, perform processing operations on behalf of a host 2. For example, the logical partition 16a1 may read data from or write data to a shared resource such as a storage system 4. Each active logical partition 16a1, 16b1 has access to shared resources such as one or more of the input/output adapters 300a, 330b . . . 300n including the host adapters 22a, 22b . . . 22n to receive processing tasks from a host 2. These processing tasks and their associated processing data may be temporarily stored in a nonvolatile storage 21a, 21b and a cache 23a, 23b assigned to the respective logical partitions 16a1, 16b1.

The input/output adaptors 300a, 300b . . . 300n to which the logical partitions 16a1, 16b1 have access also include device adaptors 24a, 24b . . . 24n to write output data from a host 2 to the storage system 4 and to receive from the storage system 4, read input data to forward to a host 2 in accordance with the particular processing operations being performed. To perform these processing operations, the logical partitions 16a1, 16b1 may each be assigned a substantial portion of the partition resources of associated processing complex 8a, 8b. Thus, for example, the source logical partition 16a1 may be assigned a majority of the CPU resources, memory resources and other dynamically assignable partition resources of the processing complex 8a. The percentage of the dynamically assignable partition resources assigned to any one source logical partition may depend upon the number of source and target logical partitions in a processing complex and the relative workloads of each source logical partition.

Each source logical partition 16a1, 16a2 also includes software code 302a1, 302b1 for the performance of the processing operations. The software code 302a1, 302b1 represents operating system code, application software code, firmware code or any other code for directing the operations of a portion or more of a logical partition. In this example, the software code 302a1, 302b1 is a particular version or level of code, represented by the designation "level 1.0."

In another operation, new software code 302a2, 302b2 may be installed (block 204) on a target logical partition, such as a target logical partition 16a2, 16b2. In this example, the new software code 302a2, 302b2 is an updated or newer version or level of the code level 1.0. This updated or newer version or level of the code is represented by the designation "level 1.1."

In the illustrated embodiment, a target logical partition 16a2, 16b2, may not perform processing operations on behalf of a host 2 while the software code 302a2, 302b2 is being updated. Thus, the target logical partition 16a2, 16b2 may not have access to the shared resources including the cache 23a, 23b and nonvolatile storage 21a, 21b of the associated processing complex 8a, 8b. For example, during code updating, each target logical partition 16a2, 16b2 may not have access to the shared host adapters 22a, 22b . . . 22n since the target logical partitions 16a2, 16b2 may not receive processing tasks from a host 2. Thus, processing tasks and their associated processing data may not be stored in memory assigned to the target logical partitions.

Similarly, in the illustrated embodiment, the target logical partitions 16a2, 16b2 may not have access to the device adaptors 24a, 24b . . . 24n of the shared resource input/output adaptors 300a, 300b . . . 300n and may not write output data from a host 2 to the storage system 4. The target logical partitions 16a2, 16b2 may not receive from the storage system 4, read input data to forward to a host 2.

In that the target logical partitions may not, in this example, perform processing operations such as input/output operations during the code update, the target logical partitions 16a2, 16b2 may each be assigned a relatively small portion of the partition resources of associated processing complex 8a, 8b prior to updating the code. Thus, for example, the target logical partition 16a2 may be assigned a single CPU (or a fraction of a single CPU), and a small amount of the memory resources and other dynamically assignable partition resources of the processing complex 8a as appropriate to maintain the target logical partition. For example, a target logical partition 16a2 may be assigned sufficient memory to maintain operation of an operating system but little or no additional operational memory may be needed.

In the illustrated embodiment, the source logical partition 16a1 maintains state information in a data structure of the nonvolatile storage 21a. This state information concerns the various states of the various state machines of the cluster 6. A synchronized copy of the cluster state information may similarly be maintained by the source logical partition 16b1 in a data structure of the nonvolatile storage 21b. These collections of state information facilitate control of the processing operations being performed by the active logical partitions 16a1, 16b1 of the cluster 6 on behalf of a host 2. The logical partitions 16a1, 16b1 may exchange state information between each other to facilitate each active partition maintaining current state information concerning cluster operations. In addition, the source logical partitions may maintain data structures which facilitate performing the processing operations in response to processing tasks received from the hosts 2.

By comparison, the target logical partitions 16a2, 16b2 may not perform I/O operations for a host 2 and may not maintain data structures concerning those I/O operations during code updating. Similarly, the target logical partitions 16a2, 16b2 may not exchange cluster state information with other logical partitions during code updating.

It is appreciated that, in some embodiments, the target logical partitions 16a2, 16b2 may perform limited I/O operations and may have limited access to shared resources 300. In some embodiments, the target logical partitions 16a2, 16b2 may maintain limited cluster state data structures and limited I/O operation data structures. The quantities of these limited amounts may vary, depending upon the particular application. However, in many embodiments, the operations undertaken, data structures maintained, partition or shared resources utilized by the target logical partitions 16a2, 16b2, may be substantially less than that of the more active source logical partitions.

Having updated the target logical partition 16a2 to the higher level (level 1.1) of software code 302a2, the source logical partition 16a1 and the target logical partition 16a2 of the processing complex 8a may be prepared for the target logical partition 16a2 to undertake processing operations. For example, control of node resources of the processing complex 8a, such as the cache 23a and the nonvolatile storage 21a, may be extended (block 206) to the target logical partition 16a2 as well as the source logical partition 16a1. Other node resources such as the shared resources as represented by the I/O adapters 300a . . . 300b, may be extended (block 206) to the target logical partition 16a2.

In the illustrated embodiment, the target logical partition 16a2 may obtain from the source logical partition 16a1 configuration data for the cache 23a, the nonvolatile storage 21a and the shared resources 300a . . . 300b including the host adaptors 22a, 22b . . . 22n and the device adaptors 24a, 24b . . . 24n. Once the logical partition 16a2 has received synchronized copies of the appropriate information, the logical partition 16a2 can configure the cache 23a, the nonvolatile storage 21a, and the shared resources 300a . . . 300b to permit use of these resources by the target logical partition 16a2.

In another operation, the partition resources of the source logical partition 16a1 may be reduced (block 208) to make additional partition resources available for the target logical partition 16a2 to perform processing operations. In the illustrated embodiment, dynamic redistribution of partition resources may be accomplished by the modules 14a, 26a.

Thus, in this example, the target logical partition 16a2 may transmit a message to the supervisor module 14a upon completion of the updating of the software code 302a2. In response, the supervisor module 14a can send a network request to the source logical partition 16a1 which "owns" a particular partition resource, instructing the source logical partition 16a1 to release the particular partition resource and put it into a quiesced state. In this manner, a partition resource may be stopped, and placed under control of the hypervisor module 26a.

In another operation, the partition resources assigned to the target logical partition may be expanded (block 210). In this example, the supervisor module 26a can send a command to the hypervisor module 26a, instructing it to reallocate a quiesced partition resource from the source logical partition 16a1 to the target logical partition 16a2 to expand the capability of the target logical partition. In addition, the supervisor module 14a can send a network request to the logical partition 16a2, instructing it to acquire the quiesced partition resource from the hypervisor module 26a and configure it for use by the logical partition 16a2.

These operations of reducing the partition resources assigned to a source logical partition such as the logical partition 16a1, and expanding the partition resources assigned to a target logical partition, such as the logical partition 16a2, may be performed for as many partition resources as appropriate to redistribute the I/O workload between the logical partitions 16a1, 6a2, as appropriate. As the logical partition 16a2 gains partition resources such as additional processing and memory resources, for example, the amount of processing operational workload which may be assumed by the logical partition 16a2 increases.

Once the target logical partition has acquired sufficient resources, a portion of the processing operation workload may be transferred (block 212) from the source logical partition 16a1, to the target logical partition 16a2. In one embodiment of such a transfer, the processing operations in the source logical partition 16a1 may be suspended (block 300, FIG. 4). In addition, the target logical partition 16a2 may request from the source logical partition 16a1, a transfer (block 402) of a copy of the cluster state information so that the target logical partition can begin to maintain its own synchronized copy of the cluster state information in a data structure of the nonvolatile storage 21a. Additional information which the target logical partition 16a2 may obtain from the source logical partition 16a1 includes lists of the hosts 2 which are not operational, and lists of the hosts 2 for which I/O operations are being performed by the cluster 6. In addition, the logical partition 16a2 can maintain synchronized copies of the data structures used in performing the I/O operations by the cluster 6. Upon receipt of this information, processing operations can be resumed (block 404) by the target logical partition 16a2. This may involve a warmstart of the functional code 302a2 of the target logical partition 16a2, depending upon the particular application.

In one embodiment, processing operations can also be resumed by the source logical partition 16a1. However, in that the source logical partition 16a1 is operating using a prior version (level 1.0) of the software code 302a1, the processing operations of the source logical partition 16a1 may be reduced or eliminated. Toward that end, the partition resources of the logical partition 16a1 may be further reduced (block 216, FIG. 2) to again make additional partition resources available for the logical partition 16a2 to perform processing operations. In addition, additional node resources such as the shared resources as represented by the I/O adapters 300a . . . 300b, may be transferred to the target logical partition 16a2. Thus, for example, the remaining host adaptors 22a, 22b . . . 22n and the device adaptors 24a, 24b . . . 24n controlled by the logical partition 16a1 may be controlled or accessed by the target logical partition 16a2.

In another operation, the partition resources assigned to the target logical partition 16a2 may be expanded (block 218) to further increase the capacity of the target logical partition 16a2 to perform processing operations. In the illustrated embodiment, dynamic redistribution of partition resources may be accomplished by the modules 14a, 26a as described above. The resultant proportional share of the partition resources controlled by the target logical partition 16a2 and the source logical partition 16a1 may vary depending upon the particular application. For example, if the source logical partition 16a1 is to be quiesced and not used for processing operations, the partition resources controlled by the source logical partition 16a1 may be reduced to a minimum.

In another embodiment, the software code of the source logical partition 16a1 may be updated in the same manner as the target logical partition 16a2. Hence, after suspending processing operations in the source logical partition 16a1, the software code 302a1 may be updated from level 1.0 to level 1.1. In the meantime, processing operations may be undertaken by the target logical partition 16a2 operating the software code 302a2 at the upgraded level 1.1. Once the software code 302a1 of the logical partition 16a1 is upgraded to the level 1.1, the shared resources and partition resources allocated to the logical partition 16a1 may be expanded as discussed above. The workload of the processing operations may be shared by the logical partitions 16a1, 162, both operating with the upgraded software code, or one logical partition may be quiesced, depending upon the particular application.

The software code 302b2 of the target logical partition 16b2 of the processing complex 8b may be upgraded to the level 1.1 from the level 1.0 in the same manner as that described above in connection with the target logical partition 16a2. The software upgrade of the target logical partition 16b2 may occur at the same time or at a different time from the upgrade of the software of the target logical partition 16a2. Similarly, the software code 302b1 of the source logical partition 16b1 of the processing complex 8b may be upgraded to the level 1.1 from the level 1.0 in the same manner as that described above in connection with the source logical partition 16a1, following the software upgrade of the target logical partition 16b2.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

Certain embodiments may be directed to a method for deploying computing instruction by a person or automated processing integrating computer-readable code into a computing system, wherein the code in combination with the computing system is enabled to perform the operations of the described embodiments.

Figure 4:
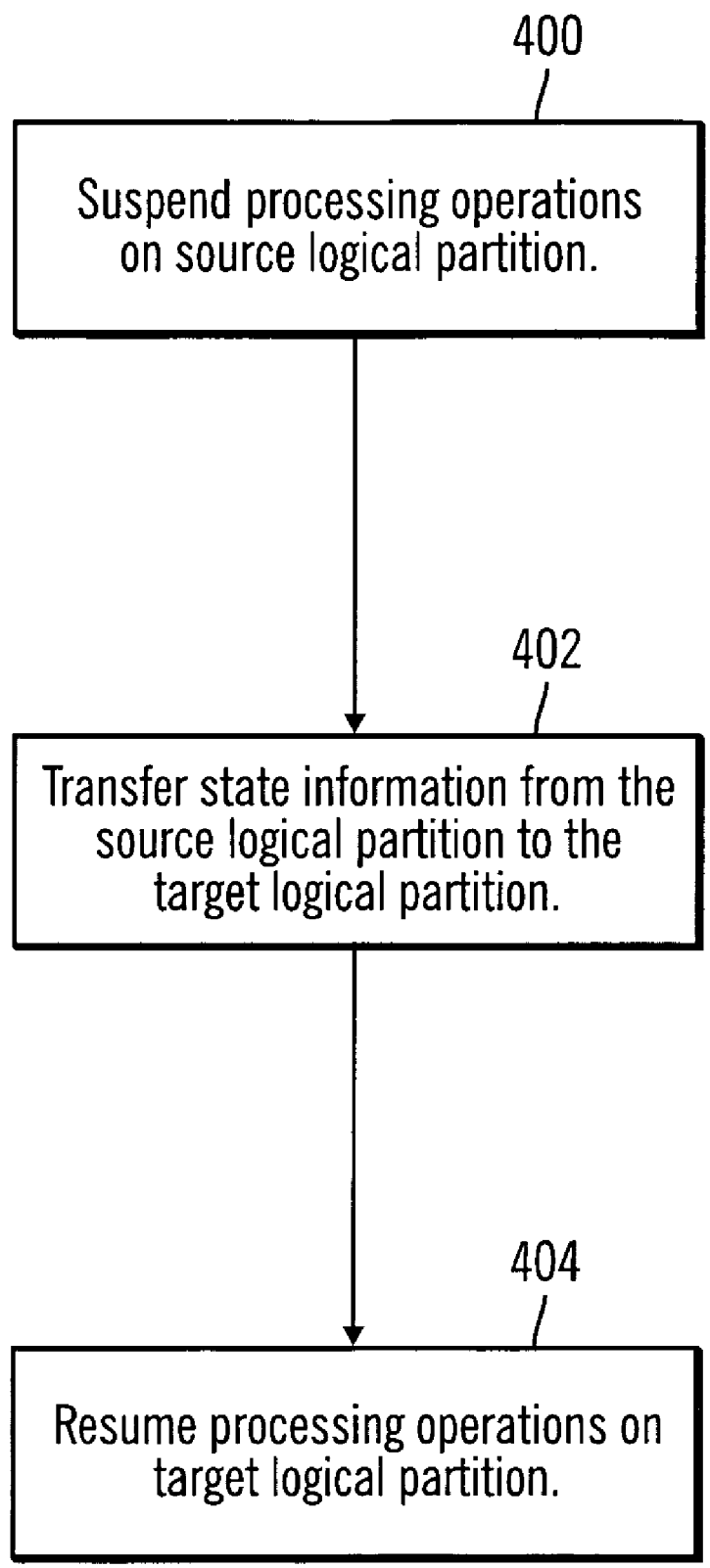
FIG. 4 illustrates additional operations to update software code in a logical partition of a processing complex.

The illustrated operations of FIGS. 2, 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Certain operations have been described as occurring between logical partitions in a peer to peer manner. Other operations have been described as being accomplished with supervisory hardware or software. It is appreciated that operations may be accomplished either in a peer to peer approach or in a supervised approach or in a combination of approaches.

Processing operations being performed have been described as including input/output operations, for example. It is appreciated that other types of processing operations may be performed on behalf of a host or as a server.

A server cluster has been described above having two processing complexes, each of which having in regular operation an source logical partition and a target logical partition. It is appreciated that in other embodiments, a server cluster may have a single processing complex or more than two processing complexes, and each processing complex may have more than one source or target logical partition.

The foregoing description of various embodiments has been presented for the purposes of illustration and description. It is not intended to be exhaustive or to limit the description to the precise form disclosed. Many modifications and variations are possible in light of the above teaching.

What is claimed is:

1. A method, comprising:

performing processing operations in a first logical partition in a first processing complex of a server cluster wherein said first logical partition operates using software code at a first level wherein the processing operations in the first logical partition include data input/output tasks directed to a storage system;

updating software code in a second logical partition of said first processing complex from said first level to a second level while continuing to perform processing operations in the first logical partition; and performing processing operations in the second logical partition subsequent to said software updating in said second logical partition, wherein said second logical partition operates using software code at said second level and wherein the processing operations in the second logical partition include data input/output tasks directed to the storage system; and transferring partition resources from said first logical partition to said second logical partition while continuing to perform processing operations in the first logical partition, and performing processing operations in a third logical partition in a second processing complex of said server cluster wherein said third logical partition operates using software code at said first level; updating software code in a fourth logical partition of said second processing complex from said first level to said second level while continuing to perform processing operations in the third logical partition; and performing processing operations in the fourth logical partition subsequent to said software code at said second level.

2. The method of claim 1 wherein said partition resources include processing, memory and cache resources, and wherein said storage system includes at least one of magnetic tape drives and interconnected hard disk drives.

3. The method of claim 2 further comprising:
transferring cluster state information from said first logical partition to said second logical partition prior to initiating said performance of processing operations in the second logical partition.

4. The method of claim 3, further comprising:
prior to transferring cluster state information from said first logical partition to said second logical partition, suspending said performance of processing operations in the first logical partition.

5. The method of claim 4, further comprising:
transferring control of input/output adapters from said first logical partition to said second logical partition while continuing to perform processing operations in the first logical partition.

6. The method of claim 5, wherein said input/output adapters include a network adapter and a storage adapter.

7. The method of claim 6 further comprising:
subsequent to said suspension of said performance of processing operations in the first logical partition, transferring control of additional input/output adapters from said first logical partition to said second logical partition while continuing to perform processing operations in the second logical partition.

8. A system, comprising:
a storage system;
a server cluster having a first processing complex having a first logical partition having memory adapted to store software code at a first level and logic adapted to perform processing operations in said first logical partition using software code at said first level wherein the processing operations in the first logical partition include data input/output tasks directed to the storage system, said first processing complex further having a second logical partition having memory adapted to store software code at said first level and logic adapted to perform processing operations in said second logical partition using software code at said first level;
wherein said first processing complex has logic adapted to update said software code in said second logical partition from said first level to a second level while said first logical partition logic continues to perform processing operations in the first logical partition; and
wherein said second logical partition logic is further adapted to perform processing operations in the second logical partition subsequent to said software updating in said second logical partition, wherein said second logical partition logic operates using software code at said second level and wherein the processing operations in the second logical partition include data input/output tasks directed to the storage system; and wherein said first logical partition has partition resources and wherein said processing complex logic is further adapted to transfer partition resources from said first logical partition to said second logical partition while said first logical partition logic continues to perform processing operations in the first logical partition; and wherein the server cluster further has a second processing complex having a third logical partition having memory adapted to store software code at said first level and logic adapted to perform processing operations in said third logical partition using software code at said first level, said second processing complex further having a fourth logical partition having memory adapted to store software code at said first level and logic adapted to perform processing operations in said fourth logical partition using software code at said first level; wherein said second processing complex has logic adapted to update said software code in said fourth logical partition from said first level to said second level while said third logical partition logic continues to perform processing operations in the third logical partition; and wherein said fourth logical partition logic is further adapted to perform processing operations in the fourth logical partition subsequent to said software updating in said fourth logical partition, wherein said fourth logical partition logic operates using software code at said second level.

9. The system of claim 8 wherein said partition resources include processing, memory and cache resources, and wherein said storage system includes at least one of magnetic tape drives and interconnected hard disk drives.

10. The system of claim 9 wherein the first logical partition logic is further adapted to maintain cluster state information and wherein the second logical partition logic is further adapted to receive and maintain cluster state information from said first logical partition prior to initiating said performance of processing operations in the second logical partition.

11. The system of claim 10, wherein the first logical partition logic is further adapted to, prior to receipt of cluster state information by said second logical partition, suspending said performance of processing operations in the first logical partition.

12. The system of claim 11, wherein said first processing complex includes input/output adapters and wherein said first processing complex logic is further adapted to transfer control of input/output adapters from said first logical partition to said second logical partition while processing operations continue in the first logical partition.

13. The system of claim 12, wherein said input/output adapters include a network adapter and a storage adapter.

14. The system of claim 13 wherein said first processing complex logic is further adapted to, subsequent to said suspension of said performance of processing operations in the first logical partition, transferring control of additional input/output adapters from said first logical partition to said second logical partition while processing operations continue in the second logical partition.

15. An article of manufacture comprising a computer readable storage medium having code executed by a system
wherein the system has a storage system and a server cluster having a first processing complex having a first logical partition having memory adapted to store software code at a first level wherein the processing operations in the first logical partition include data input/output tasks directed to the storage system, said first processing complex further having a second logical partition having memory adapted to store software code at said first level, and wherein the system executed operations comprise:
performing processing operations in the first logical partition in the first processing complex of the server cluster wherein said first logical partition operates using said software code at said first level;

updating software code in the second logical partition from said first level to a second level while continuing to perform processing operations in the first logical partition; and performing processing operations in the second logical partition subsequent to said software updating in said second logical partition, wherein said second logical partition operates using software code at said second level and wherein the processing operations in the second logical partition include data input/output tasks directed to the storage system; and wherein said first logical partition has partition resources and wherein said system executed operations further comprise transferring partition resources from said first logical partition to said second logical partition while said first logical partition logic continues to perform processing operations in the first logical partition; and wherein the server cluster further has a second processing complex having a third logical partition having memory adapted to store software code at said first level, said second processing complex further having a fourth logical partition having memory adapted to store software code at said first level, and wherein the system executed operations further comprise: performing processing operations in the third logical partition in the second processing complex of said server cluster wherein said third logical partition operates using software code at said first level; updating software code in the fourth logical partition from said first level to said second level while continuing to perform processing operations in the third logical partition; and performing processing operations in the fourth logical partition subsequent to said software updating in said fourth logical partition, wherein said fourth logical partition operates using software code at said second level.

16. The article of claim 15 wherein said partition resources include processing, memory and cache resources, and wherein said storage system includes at least one of magnetic tape drives and interconnected hard disk drives.

17. The article of claim 16 wherein the system executed operations further comprise maintaining cluster state information in said first logical partition logic, and transferring cluster state information from said first logical partition to said second logical partition prior to initiating said performance of processing operations in the second logical partition.

18. The article of claim 17, wherein the system executed operations further comprise, prior to transferring cluster state information from said first logical partition to said second logical partition, suspending said performance of processing operations in the first logical partition.

19. The article of claim 18, wherein said first processing complex includes input/output adapters and, wherein the system executed operations further comprise transferring control of input/output adapters from said first logical partition to said second logical partition while continuing to perform processing operations in the first logical partition.

20. The article of claim 19, wherein said input/output adapters include a network adapter and a storage adapter.

21. The article of claim 20 wherein the system executed operations further comprise subsequent to said suspension of said performance of processing operations in the first logical partition, transferring control of additional input/output adapters from said first logical partition to said second logical partition while continuing to perform processing operations in the second logical partition.

22. A method for deploying computing instructions, comprising:

integrating computer-readable code into a system, wherein the system has a storage system and a server cluster having a first processing complex having a first logical partition having memory adapted to store software code at a first level, said first processing complex further having a second logical partition having memory adapted to store software code at said first level, and wherein the code in combination with the system is enabled to cause the system to perform:

processing operations in the first logical partition in the first processing complex of the server cluster wherein said first logical partition operates using said software code at said first level wherein the processing operations in the first logical partition include data input/output tasks directed to a storage system;

updating software code in the second logical partition from said first level to a second level while continuing to perform processing operations in the first logical partition; and processing operations in the second logical partition subsequent to said software updating in said second logical partition, wherein said second logical partition operates using software code at said second level and wherein the processing operations in the second logical partition include data input/output tasks directed to the storage system; and wherein said first logical partition has partition resources and wherein the code in combination with the system is further enabled to cause the system to perform transferring partition resources from said first logical partition to said second logical partition while said first logical partition logic continues to perform processing operations in the first logical partition; and wherein the server cluster further has a second processing complex having a third logical partition having memory adapted to store software code at said first level, said second processing complex further having a fourth logical partition having memory adapted to store software code at said first level, and wherein the code in combination with the system is further enabled to cause the system to perform: processing operations in the third logical partition in the second processing complex of said server cluster wherein said third logical partition operates using software code at said first level; updating software code in the fourth logical partition from said first level to said second level while continuing to perform processing operations in the third logical partition; and processing operations in the fourth logical partition subsequent to said software updating in said fourth logical partition, wherein said fourth logical partition operates using software code at said second level.

23. The method of claim 17 wherein said partition resources include processing, memory and cache resources, and wherein said storage system includes at least one of magnetic tape drives and interconnected hard disk drives.

24. The method of claim 23 wherein the code in combination with the system is further enabled to cause the system to perform maintaining cluster state information in said first logical partition logic, and transferring cluster state information from said first logical partition to said second logical partition prior to initiating said performance of processing operations in the second logical partition.

25. The method of claim 24 wherein the code in combination with the system is further enabled to cause the system to perform, prior to transferring cluster state information from said first logical partition to said second logical partition, suspending said processing operations in the first logical partition.

26. The method of claim 25, wherein said first processing complex includes input/output adapters and wherein the code in combination with the system is further enabled to cause the system to perform transferring control of input/output adapters from said first logical partition to said second logical partition while continuing to perform processing operations in the first logical partition.

27. The method of claim 26, wherein said input/output adapters include a network adapter and a storage adapter.

28. The method of claim 27 wherein the code in combination with the system is further enabled to cause the system to perform, subsequent to said suspension of said performance of processing operations in the first logical partition, transferring control of additional input/output adapters from said first logical partition to said second logical partition while continuing to perform processing operations in the second logical partition.

* * * * *